United States Patent [19]

Saunders

[11] 4,018,214
[45] Apr. 19, 1977

[54] HEATING AND VENTILATION SYSTEM

[76] Inventor: Norman B. Saunders, 15 Ellis Road, Weston, Mass. 02193

[22] Filed: Dec. 10, 1975

[21] Appl. No.: 639,304

Related U.S. Application Data

[62] Division of Ser. No. 529,235, Dec. 3, 1974, Pat. No. 3,952,947.

[52] U.S. Cl. .............................................. 126/271
[51] Int. Cl.² ........................................... F24J 3/02
[58] Field of Search ............. 237/66, 1 A; 126/400, 126/271

[56] References Cited

UNITED STATES PATENTS 3,903,665   9/1975   Harrison ...................... 126/271 UX

FOREIGN PATENTS OR APPLICATIONS 696,014   5/1930   France ................................ 237/66

OTHER PUBLICATIONS

B512,745, Jan. 1976, Deminet et al., 126/271.

Primary Examiner—William E. Wayner
Attorney, Agent, or Firm—Schiller & Pandiscio

[57] ABSTRACT

A system is described for storing near infrared heat energy of the sun for use in a building including at least one glazing panel for transmitting the light and near infrared heat energy of the sun into the building. The system comprises a first tank capable of being completely filled with a heat absorbing fluid and positioned relative to the glazing panel so as to be exposed to at least a portion of the heat energy transmitted through the glazing panel and so that the heat absorbing fluid in the tank absorbs at least a part of the portion of the energy. A second tank is in fluid communication with the first tank and disposed above the first tank. The system also includes conduit means connecting the bottom of the first tank and the second tank so that fluid disposed on the bottom of the first tank will flow into the second tank when the fluid in the first tank expands, and so that fluid disposed in the second tank will flow into the first tank when the fluid in the first tank contracts.

8 Claims, 1 Drawing Figure

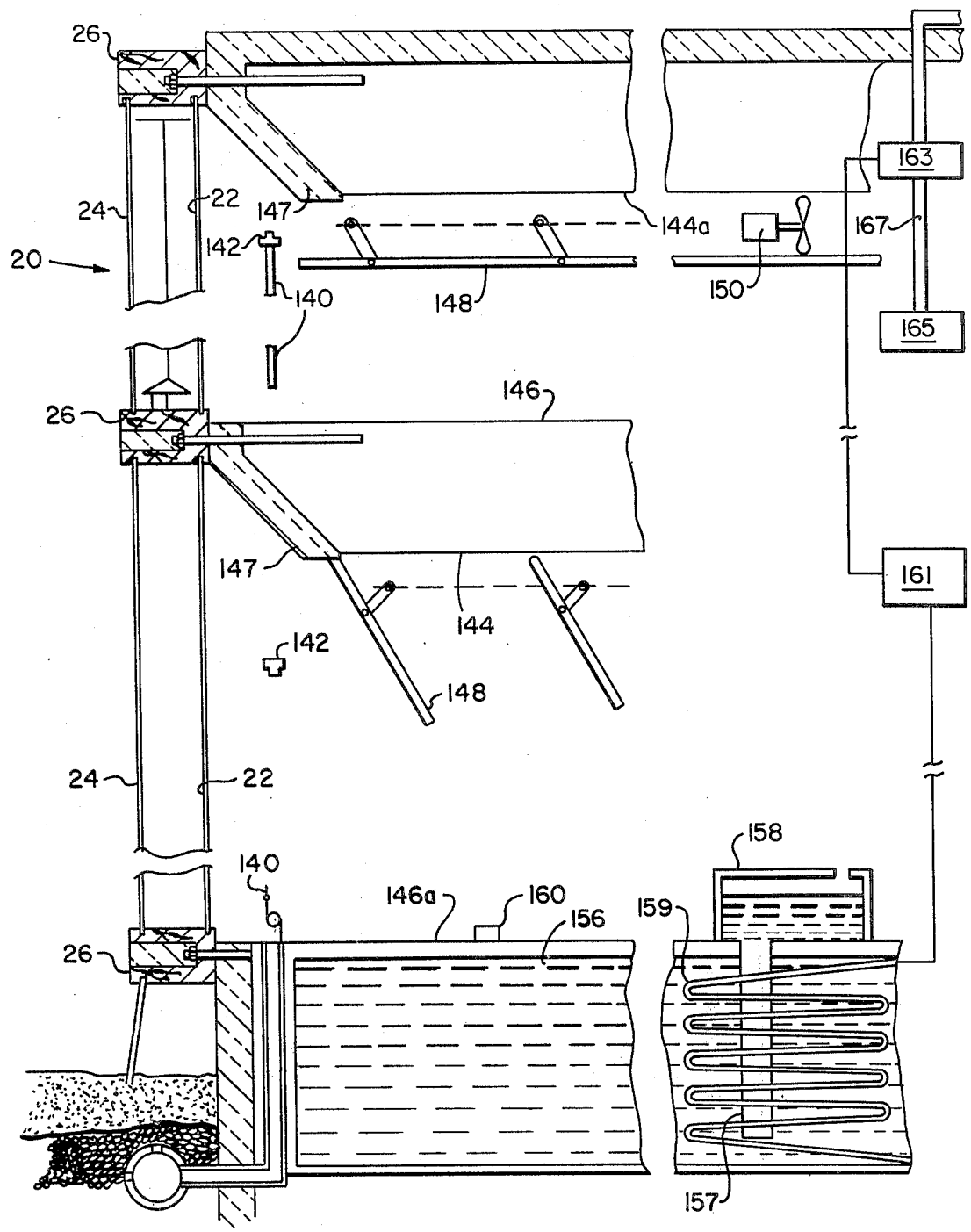

HEATING AND VENTILATION SYSTEM

This application is a division of Ser. No. 529,235, filed 12/3/74, now U.S. Pat. No. 3,952,947.

This invention relates to the heating and ventilation systems and more specifically, to a system for naturally controlling the temperature and humidity within an enclosed building.

With the advent of the energy crisis, serious efforts are now being made to harness solar energy or "insolation", i.e. energy received from the sun. As a result, various systems have been developed, such as specially designed glazed windows for absorbing the sun's energy, and reradiating it into the building structure. Many of these systems, however, are highly inefficient since the window itself becomes hot resulting in energy loss through the window. Another disadvantage of many of these glazed window systems is that heat is only provided so long as the sun is shining. Further, glazed windows usually form a closed system, and thus separate ventilation and humidification systems must be provided. This is psychologically displeasing to the occupants of the building, since many of these separate ventilation systems do not always provide fresh air but merely recirculate it.

Another type of system which is generally known employs water as a heat absorber and carrier. The water can absorb heat by either flowing over a directly-exposed sloping roof (which may be heat reflective); or by flowing adjacent heat collectors, the latter absorbing heat energy from the sun and transferring or reradiating energy in order to heat the water. Many of the water systems, however, suffer from some of the same disadvantages as the glazed window systems mentioned above.

A third type of system generally known, employs photovoltaic cells which generally provide electromagnetic forces when directly exposed to the sun's energy. These photovoltaic cells are relatively expensive and thus this type of system is at this time not commercially acceptable.

Accordingly, an object of the present invention is to overcome the above-noted disadvantages.

Other objects of the present invention are to provide: a system which stores a portion of the solar energy or insolation and releases it when temperatures within the building drop; more specifically, to an improved heat sink thermally coupled to a building for storing some of the insolation received so that it can be released as the temperature drops in the building.

These and other objects are achieved by a system for use in a building which comprises a first tank capable of being completely filled with a heat absorbing fluid and positioned relative to a glazing panel of the building so as to be exposed to at least a portion of the heat energy transmitted through the glazing panel and so that heat absorbing fluid in the tank absorbs at least a part of the portion of this heat energy. A second tank in fluid communication with the first tank and disposed above the first tank is also provided. Finally, conduit means connecting the bottom of the first tank and the second tank so that fluid disposed from the bottom of the first tank will flow into the second tank when the fluid in the first expands, and so that fluid disposed in the second tank will flow into the first tank when the fluid in the first tank contracts.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein:

The FIGURE shows a partial schematic and partial vertical crosssection through the wall of the building which is exposed to solar radiation which is constructed in accordance with the teachings of the present invention.

In the drawings, like numerals refer to like parts.

The FIGURE shows the wall of building 20 which is exposed to solar radiation. Although the building 20 is shown as a multi-story structure, the invention may be also employed in single-story buildings. The wall of building 20 comprises windows having an inner glazed panel 22 and an outer panel 24. Both panels are made of material which is transmissive to both light and near infrared heat energy, and opague to middle and far infrared heat energy, such as glass or the like. The panels are preferably sealed in place at their top and bottom edges in the heat insulated sills 26 in a manner well known in the art. The building may also include curtains 140 which may be provided if privacy is desired. Curtains 140 are supported in any suitable manner such as by curtain rod 142 so that they are spaced from the interior ceiling 144, panel 22, and floor 146. Curtains 140 are spaced from the inner surface of panel 22 so that air along the surface will be stagnant, moving generally in neither an upward or downward direction when winter insolation is striking the curtain. For example, for standard eight foot high curtains, the latter are spaced from the panel 22 about 0.1 meters. The rod 142 is spaced from the ceiling a distance depending on how much top lighting is desired. The spacing at the bottom of the curtain and the floor is made approximately half the spacing to the panel 22 in order to provide a path for circulating air. It is noted that the curtain, when used on a wall minimally exposed to solar energy, may extend all the way to the floor in order to help keep the heat within the building. Curtains 140 preferably should be made of material which is opague and absorptive to the visible and near infrared portion of the spectrum, but transparent or reflecting to all other infrared, (i.e. heat in the building). For example, cellophane or other completely transmissive sheets containing small grains of silicon, germanium, thallium bromide-iodide or similar materials opague in the visible and near infrared but transmissive and highly reflective to all other infrared are satisfactory. An example of the dimensions of a finished sheet would be a sheet having an overall thickness of between 25 and 100 micrometers and the grains from 5 to 25 micrometers in diameter. The floors 146 and ceiling 144 preferably are made of material which has a high heat capacity and heat conductivity, such as concrete or the like. Where the floor is covered, such a covering must be made of a thin and high thermally conductive material. The floors and ceilings are well insulated from the sills 26 in a manner well known in the art. The portion 147 of the ceiling adjacent the window is inclined at an angle, e.g. 45° and is preferably heat reflective. Insulating panels 148 are pivotally supported from each ceiling 144 so that in a closed position they form a duct therebetween, and in an open position, expose the ceiling to the interior rooms. The panels may be made of any heat insulating material such as foamed polystyrene or the like, and preferably are surfaced to be reflective to the full infrared spectrum. A fan 150 which may be thermostatically controlled is placed between the panels 148 and each ceiling 144 so as to draw air from interior portion of the building near the window through the building and circulate the air therein as will be described in greater detail hereinafter. This is particularly desirable when the building is provided with interior partitions.

In the preferred embodiment of the present invention a thermal delay and heat sink is incorporated into the building structure for storing a portion of the sun's energy entering through panels 22 and 24 so that this energy can be released at a later time into the buildng.

The thermal delay and heat sink are in part provided by the intermediate concrete floor slabs. For example, if these floors are made 0.2 meters thick, the midafternoon heating of the bottom of the slabs produces a maximum heat release on the topside about dawn the next day when heat is usually most needed. In the preferred embodiment this heat sink is in part provided by the tank 156. The latter is filled with a heat absorbing fluid such as water or the like. It is preferred that the fluid completely fill the tank 156 since an air gap would act as a heat insulator and thus inhibit heat flow between the floor 146a and the fluid in the tank. An expansion tank 158 is preferably provided on the bottom floor which is in fluid contact with the tank 156 to hold the overflow from the latter. A pipe 157 is also provided wherein one end is placed near the bottom of the tank 156 and the other is placed in the bottom of the expansion tank 158. Since the coolest portion of the fluid is on the bottom of the tank 156, this portion will flow through pipe 157 into the expansion tank 158 when the fluid expands from heat input and fluid will flow back through pipe 157 into the tank 156 from tank 158 when fluid in tank 156 contracts. This structure utilizes the physical properties of water to maintain deaireation. However, a float or needle valve 160 may further be provided to let air out in order that the fluid will come into contact with the top of tank 156 when the latter is filled. If desired, the heat "storing" capabilities of the tank can be improved by making the bottom floor 146a transmissive to the visible and near infrared and the bottom of the tank radiant heat energy absorptive, in which case the pipe 157 and expansion tank may be eliminated and tank 156 need not be completely filled with fluid. Tubing 159 is connected from the tank 156 to a compressor 161. Tubing 159 is coiled in the fluid of tank 156 so as to provide an evaporator during warm weather and a condensor during cold weather. The compressor 161 is also connected to heat exchanger 163. The latter is attached to or secured in the top ceiling 144a. Tubing 157 and exchanger 163 function to provide heat to the tank 156 in the winter and carry heat from tank 156 in the summer. The heat exchanger 163 forms part of the heating and ventilation system which also includes blower 165 which is connected to the exterior portion of the building through pipe 167.

When it is desirable to utilize the insolation received to heat the interior of the building, the energy will be transmitted through the glazed panels 22 and 24 whereupon it will strike each floor 146. The visible and near infrared energy of the insolation absorbed will be mostly conducted to the floor 146 only a small portion of which will be reradiated as energy in the far infrared region of the electromagnetic spectrum. Insolation energy will also be transferred from the floor 146 into the fluid in tank 156.

On days of exceptionally high insolation, the curtains 140 are drawn. During cold days when the curtain is drawn the warm air moving up both sides of curtain 140 will move along the underside of ceiling 144, where heat is transferred from the air to the ceiling. Fans 150, may be used to air the transfer. The cool air returns along the floor and enters the space between the curtain 140 and panel 22. Since the curtain 140 and panel 22 are spaced to minimize motion of air adjacent the panel 22, the air passing between the panel and the curtain will be heated by heat transfer from the curtain with a minimum heat loss to the panel. Heat is stored in the ceiling during the day. During this time panels 148 may be pivoted to their closed position so as to substantially block heat transfer from the ceiling into the room. The heat stored in the ceiling during this time is transferred to the top of the slab 146 by the next morning. The remainder of the stored heat can be released directly into the room below either by natural heat convection or thermostatically by opening the panels 148. When the sun is not shining and the interior begins to cool, the heat absorbed in the floors will be convected and reradiated into the rooms, to provide heat.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. In a building including at least one glazing panel for transmitting the light and near infrared heat energy of the sun, a system for storing said heat energy comprising in combination:
    a first tank capable of being completely filled with a heat absorbing fluid and positioned relative to said glazing panel so as to be exposed to at least a portion of said heat energy transmitted through said glazing panel and so that said heat absorbing fluid absorbs at least a part of said portion of heat energy,
    a second tank in fluid communication with said first tank and disposed above said first tank; and
    conduit means connecting the bottom of said first tank and said second tank so that fluid disposed on the bottom of said first tank will flow into said second tank when the fluid in said first tank expands, and so that fluid disposed in said second tank will flow into said first tank when the fluid in said first tank contracts.

2. A heat storage system in accordance with claim 1, further including a fluid disposed in said first and second tank.

3. A heat storage system in accordance with claim 2, wherein said fluid is water.

4. A heat storage device in accordance with claim 1, wherein one of said first and second tanks includes a needle valve.

5. A building structure comprising, in combination:

at least one glazing panel mounted on said structure and transmissive to light and near infrared heat energy;

a first tank disposed in at least a portion of a floor of said structure and positioned relative to said glazing panel so that said portion of said floor is exposed to at least a portion of said heat energy transmitted through said glazing panel;

a second tank in fluid communication with said first tank and disposed above said first tank;

a heat absorbing fluid disposed in at least said first tank and capable of absorbing at least a part of the portion of said heat energy exposed to said floor portion;

conduit means connecting the bottom of said first tank and said second tank so that said fluid disposed on the bottom of said first tank will flow into said second tank when said fluid in said first tank expands, and so that any fluid disposed in said second tank will flow into said first tank when the fluid in said first tank contracts.

6. A structure in accordance with claim 5 wherein said floor portion is made of a material absorptive to said heat energy.

7. A structure in accordance with claim 6, wherein said material is concrete.

8. A structure in accordance with claim 5 wherein said floor portion is made of a material transmissive to said heat energy.

* * * * *